United States Patent [19]

Härle

[11] Patent Number: 4,556,868
[45] Date of Patent: Dec. 3, 1985

[54] CMI DECODER

[75] Inventor: Hans G. Härle, Leitershofen, Fed. Rep. of Germany

[73] Assignee: Siemens Aktiengesellschaft, Berlin and Munich, Fed. Rep. of Germany

[21] Appl. No.: 555,309

[22] Filed: Nov. 25, 1983

[30] Foreign Application Priority Data

Dec. 10, 1982 [DE] Fed. Rep. of Germany ....... 3245845

[51] Int. Cl.$^4$ .......................................... H03K 13/24
[52] U.S. Cl. ............................................. 340/347 DD
[58] Field of Search .................. 340/347 DD; 360/40; 375/47, 55

[56] References Cited

U.S. PATENT DOCUMENTS

| | | |
|---|---|---|
| 3,967,061 | 6/1976 | Dobias .......................... 340/347 DD |
| 3,987,395 | 10/1976 | Desombre et al. ...................... 325/2 |
| 4,325,053 | 4/1982 | Le Brozec et al. .......... 340/347 DD |
| 4,442,528 | 4/1984 | Fukuda ........................ 340/347 DD |

FOREIGN PATENT DOCUMENTS 2525533 12/1975 Fed. Rep. of Germany .
3033351 4/1982 Fed. Rep. of Germany .
3031579 6/1982 Fed. Rep. of Germany .

*Primary Examiner*—Vit W. Miska
*Attorney, Agent, or Firm*—Max Moskowitz

[57] ABSTRACT

The invention relates to a decoder for the translation of CMI coded signals into binary signals.

The invention discloses a decoder containing three emitter-coupled differential amplifiers with two stages each, each of the first and the second differential amplifiers forming separately a cascade with one of the stages of the third differential amplifier. One input each of the first and second differential amplifiers is connected to the input for the CMI coded signals while the other two inputs of these differential amplifiers are connected to a reference voltage source. One input of the third differential amplifier is connected, via a time delay section, to the input for the CMI coded signals or to an input for inverse CMI coded signals while the other input of this differential amplifier is connected to a second reference voltage source.

The decoder according to the invention is used in transmission equipment for digital signals with bit rates of about 140 Mbit/s.

8 Claims, 5 Drawing Figures

CMI DECODER

BACKGROUND OF THE INVENTION

The invention relates to a CMI decoder for the translation of CMI coded signals into binary signals with differential amplifiers connected to the input side.

From German patent document DE-OS No. 3033351 is known a coder to generate signals in CMI code. This code involves a two-stage NRZ code in which a zero character is represented by the combination of a half-bit long logic "1" signal followed by a half-bit long logic "0" signal whereas continuous 1 characters appear as alternating logic "1" and logic "0" characters of full bit length. This CMI code is defined by the CCITT for the 140 Mbit/s interfaces in the hierarchic structure of a digital signal transmission in Recommendation G.703.

A CMI decoder is known from the Hewlett Packard Service Manual for the measuring instrument "Error Detector" HP 3763 A FIG. A4-3, Part 2. The known CMI decoder has two differential amplifiers disposed at the input side of the decoder. The output of one differential amplifier being connected directly to a gate network and the output of the other being connected via delay sections to the gate network. Due to the use of five OR/NOR circuits the design of the known CMI decoder is costly, and when used in remotely fed arrangements the high power input may also play a role.

For the correct regeneration of the signals it is necessary to obtain a clock signal from the CMI signal received. As is known, this is not easily achieved because, as may be seen from lines E and B of FIG. 3, in CMI signals pulse lengths may range between 0.5 times ans 1.5 times a bit length. Therefore, obtaining a signal of a clock frequency in proper phase by simply filtering it out of CMI coded signals is impossible. For this reason the state of the art requires a subsequent decoder, an expensive circuit with five more gates and other components to obtain a clock signal.

SUMMARY OF THE INVENTION

It is an object of the present invention to provide a less expensive CMI decoder which can be used at bit rates of 140 Mbit/s, which consumes little power and which is capable of obtaining a clock signal of a proper phase for CMI signals.

According to the invention, this and other objectives are realized in that a first, a second and a third differential amplifier are provided; that the input of the first stage of the first differential amplifier is connected to the input of the second stage of the second differential amplifier and to a first reference voltage source; that the inputs of the second stage of the first differential amplifier and the first stage of the second differential amplifier are connected to each other and to an input terminal; that the first differential amplifier forms with the first stage of the third differential amplifier a first cascade circuit and the second differential amplifier forms with the second stage of the third amplifier a second cascade circuit; that the input of the second stage of the third differential amplifier is connected to a second reference voltage source of negative potential relative to the first reference voltage source; that the input of the first stage of the third differential amplifier is connected to the input for the CMI coded signals via a time delay section of a delay corresponding to half a bit length; and that the outputs of the various stages of the first and second differential amplifiers represent the outputs for binary signals resulting in the desired RZ signal by combining two signals to obtain a composite decoded binary signal.

An advantage of the CMI decoder according to the present invention is its implementation which avoids costly balancing provisions because only the delay section needs adjustment to obtain a delay of about half a bit length.

Other features and advantages of the invention will be apparent from the following description of the preferred embodiments, and from the claims.

For a full understanding of the present invention, reference should now be made to the following detailed description of the preferred embodiments of the invention and to the accompanying drawings.

DETAILED DESCRIPTION

Figure 1:
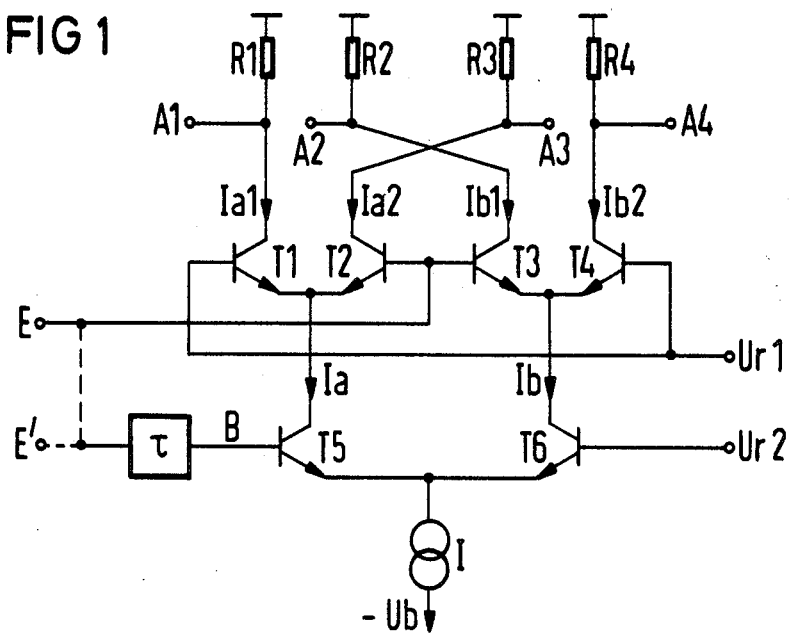
FIG. 1 shows a basic preferred circuit of a decoder according to the invention.

The CMI decoder shown in FIG. 1 contains a differential amplifier arrangement with two inputs, one input being preceded by a delay section $\tau$. The differential amplifier arrangement contains a first, a second, and a third emitter-coupled differential amplifier of two stages each, each stage containing an n-p-n transistor. Contained in the first stage of the first differential amplifier is the first transistor T1 whose collector is connected to the first output A1 and, via a first resistor R1, to a reference potential, the current Ia1 flowing through T1. Contained in the second stage of the first differential amplifier is a second transistor T2 whose collector is connected to the third output A3 and, via a third resistor R3, to reference potential, the current Ia2 flowing through T2. Contained in the first stage of the second differential amplifier is a third transistor T3 whose collector is connected to the second output A2 and, via a second resistor R2, to reference potential, the current Ib1 flowing through T3. Contained in the second stage of the second differential amplifier is a fourth transistor T4 whose collector is connected to a fourth output A4 and, via a fourth resistor R4, to reference potential, the current Ib2 flowing through T4.

The base terminals of the second and third transistors T2, T3 are connected to each other and to the input E for the CMI coded signals.

The base terminals of the first and fourth transistors T1, T4 are connected to each other and to a first reference voltage source Ur1. The emitter terminals of the first and second transistors T1, T2 are connected to each other and to the collector terminal of a fifth transistor T5 contained in the first stage of a third differential amplifier. The emitter terminals of the third and fourth transistors are also connected to each other and, in addition, to the collector terminal of a sixth transistor T6 contained in the second stage of the third differential amplifier. The emitter terminals of the fifth and sixth transistors T5, T6 are connected to each other, and via a current source for the current I, to a terminal for the operating voltage −Ub. The first differential amplifier forms with the first stage of the third differential amplifier carrying the current Ia a first cascade circuit, while the second differential amplifier forms with the second stage of the third differential amplifier carrying the current Ib a secondcascade circuit. The base terminal of the sixth transistor T6 is connected to a second reference voltage source Ur2 while the base terminal of the fifth transistor T5 is connected at a point B to the output of a delay section $\tau$, which generates a delay corresponding to half a bit length for the signals flowing through it. In the first case, the input terminal of the delay section may be connected to the input E for the CMI coded signals, in the second case to the input lead E' for the inverse (complemented) CMI coded signals. In the case above, the binary signals generated appear at the third and fourth outputs A3, A4 and result in the desired binary RZ signal after their combination.

Figure 3:
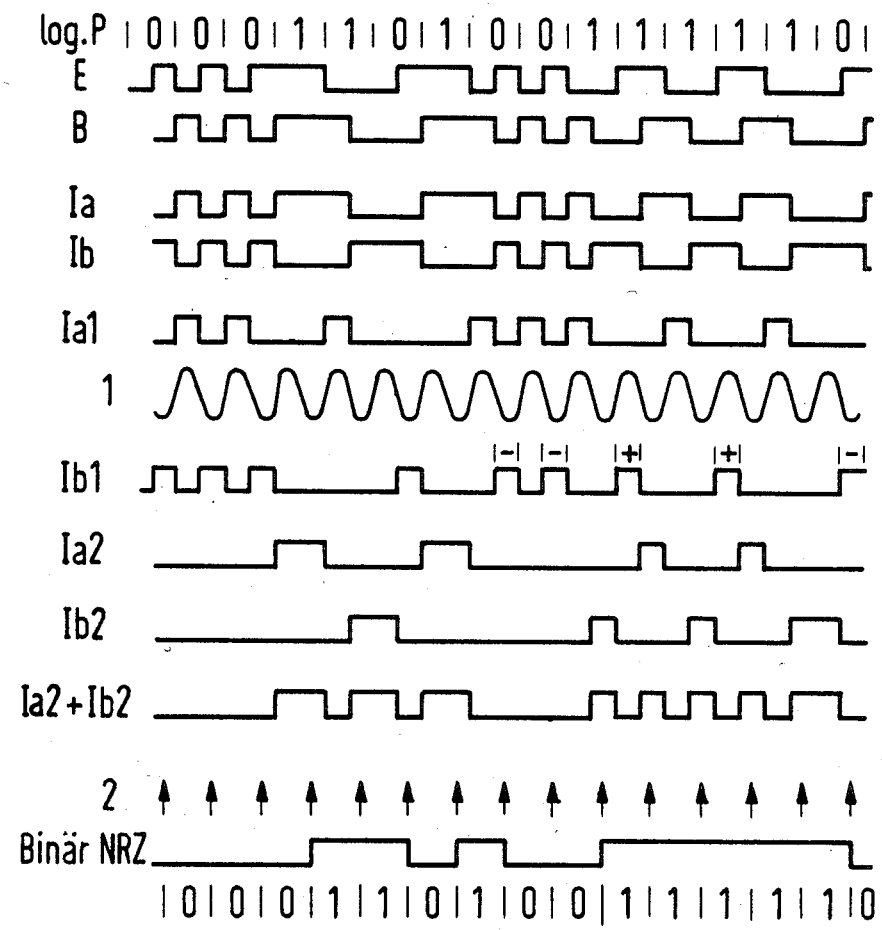
FIG. 3 shows is a first timing diagram for the decoder according to FIG. 1.

FIG. 3 shows a timing diagram for the case under discussion. In the uppermost line Log. P is the logic level for the input signals shown in line E. It is evident that line E involves CMI coded signals because the zero bits are represented by a double pulse while the 1 bits are represented alternately by pulses of full bit length.

Shown in line B is the signal at the delay section output which is delayed by half a bit relative to the signal in line E. Line Ia and Ib represent the currents through the first and second stages, respectively, of the third differential amplifier, which currents are mutually inverse as shown.

The current Ia1, generated from Ia, of the first stage of the first differential amplifier only contains pulses of half bit length yet a clock signal in proper phase can be filtered out of this current, or out of the voltage generated at the resistor R1, by means of a resonant circuit.

Shown in line Ib1 is the current through the first stage of the second differential amplifier which, however, is not utilized in the present case. The currents Ia2 and Ib2 of the second stage of the first and second differential amplifiers occurs as pulses. They include the orginal 1-pulses contained in the CMI coded signals and the originally negative 1-pulses in current Ib2. By connecting the two associated output terminals A3 and A4 to the binary section signals a binary RZ signal is obtained in which the 1-pulses of both stages are contained. If this signal is interrogated in the middle of the half bit long pulses, such as by a subsequent D-flipflop with a second clock (clock 2) obtained by shifting the first clock (clock 1) timewise, the result is the binary NRZ signal shown in the last line, which signal is a regenerated amplitude and time waveform of the original signal.

Figure 4:
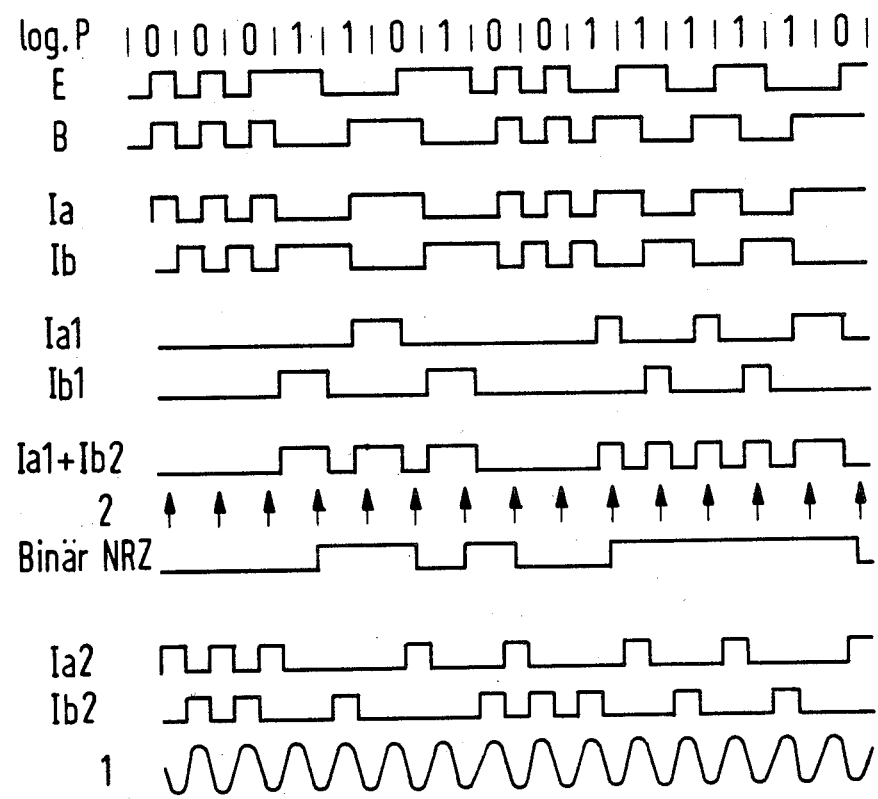
FIG. 4 shows a second timing diagram for the decoder according to FIG. 1.

In a second case, the input of the delay section $\tau$ is connected to an input E' for the inverse CMI coded signals. This case is explained with reference to the timing diagram of FIG. 4. It shows the logic level log.P. of the input signal E and the signal appearing at point B. The currents Ia and Ib of the two stages of the third differential amplifier are again inverse to each other. As is evident, in this case the current Ia1 of the first stage of the first differential amplifier does not contain the clock information which, in this case, is contained in the currents Ia2 and Ib2 of the second stages of the first and second differential amplifiers. The clock information in the second stage of the second differential amplifier appears in correct phase. The currents Ia1 and Ib1 represent the 1-pulses originally contained in the CMI coded input signal. Upon combination of both currents the binary RZ signal results which, scanned with a first clock signal shifted timewise according to the second clock, results in a binary NRZ signal.

Figure 2:
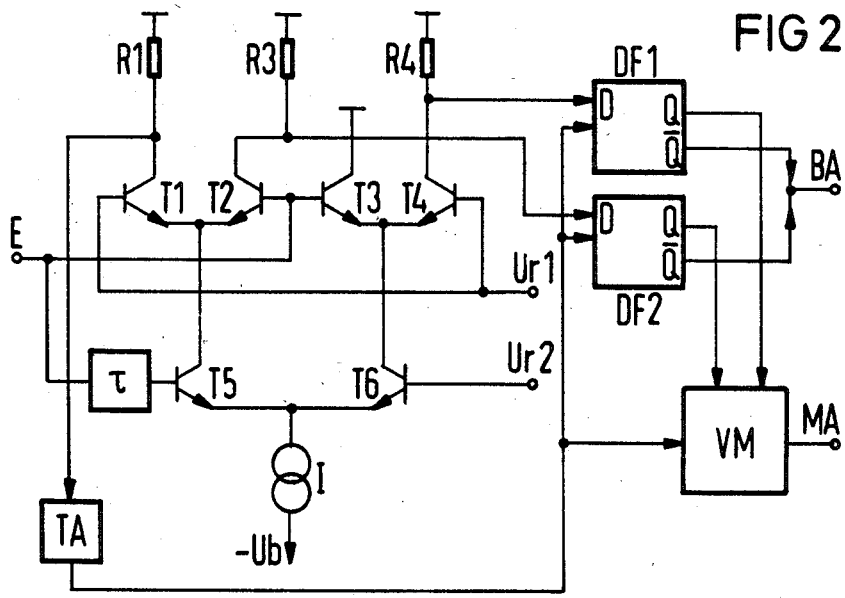
FIG. 2 shows the basic circuit of a decoder according to the invention with a circuit for the generation of timewise regenerated, binary signals.

The decoder shown in FIG. 2 is wired in accordance with the first case discussed in which the delay section $\tau$ is connected to the input E in FIG. 1 and the related FIG. 3. Since the output signal at terminal A2 is of no interest, the collector terminal of the third transistor T3 was connected directly to a reference potential. The clock information at the first resistor R1 is fed to a clock derivation circuit TA which contains a trap amplifier with a resonant circuit tuned to the clock frequency, a phase shifter, and an amplifier. Connected to the collector terminals of the second and the fourth transistor T2 and T4 are the D-inputs of a first and second D-flipflop DF1, DF2 with clock inputs connected to the output of the clock derivation circuit TA. It is through these D-flip-flops that a timewise regeneration of the binary RZ signal is preformed with the scanning clock (clock 2), whereby the binary NRZ signal is produced. The inverting outputs $\overline{Q}$ of the two D-flipflops are connected to each other and to an output BA for the binary output signal.

In addition, the decoder according to FIG. 2 is supplemented by a code violation monitor VM. As already explained, the currents Ia2 and Ib2 contain the 1-pulses originally contained in the CMI coded signal separated according to their original polarities. Since a positive 1-pulse must always be followed by a negative 1-pulse in the CMI code, a pulse in current Ia2 must accordingly be followed by a pulse in current Ib2 and then again by a pulse in current Ia2.

After the separate, timewise regeneration of the pulses according to the original positive and negative 1 pulses in the two D-flipflops, the corresponding code format monitoring pulses are available at the outputs of these D-flipflops. The Q-outputs of the two D-flipflops are therefore connected to signal inputs of the code violation monitor VM which monitors the pulse alternation in the current Ia2 and Ib2 in accordance with known code violation monitors for the AMI code. The VM transmits an appropriate output signal to the output MA for further monitoring or alarming in the event of a code format violation.

Figure 5:
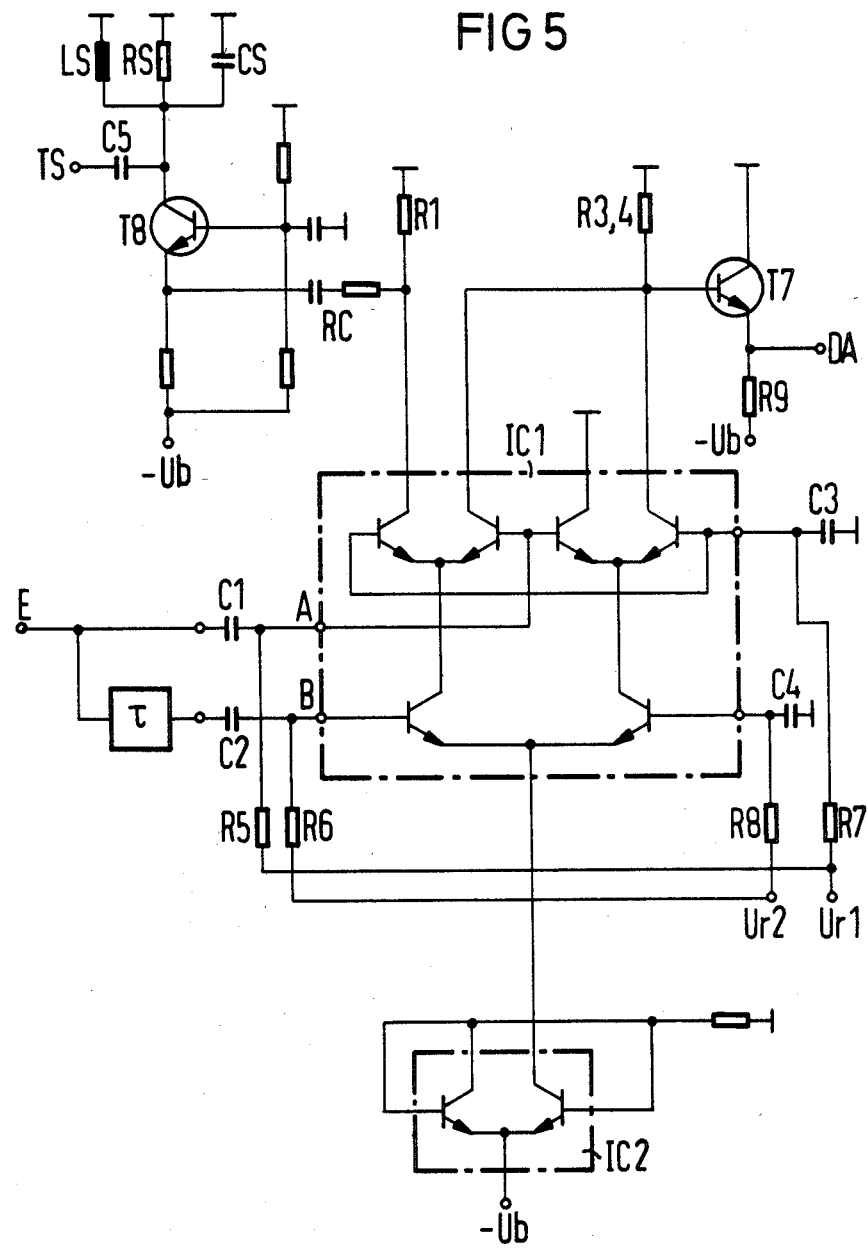
FIG. 5 shows is a detailed circuit diagram of a further preferred embodiment of the decoder according to the invention.

In FIG. 5 is shown a further embodiment of the decoder according to FIG. 1 with additional features. It shows the case where the input of the time delay section $\tau$ is connected to the input E for the CMI coded signals. The transistors T1 through T6 form part of a first integrated circuit Ic1, the inputs A and B of which are connected, via a first and second coupling capacitor C1, C2 to the input E and to the output of the delay section $\tau$, respectively. The inputs of the second stage of the first differential amplifier and of the first stage of the second differential amplifier are connected to the input A while the input of the first stage of the third differential amplifier is connected to the input B. The inputs of the second stage of the first differential amplifier and of the first stage of the second differential amplifier are connected via the fifth resistor R5 and the inputs of the first stage of the first differential amplifier via the seventh resistor R7 to the first reference voltage source Ur1 so that, without signal, all stages contain the same bits. The capacitor C3, inserted between the reference potential and the second stage input of the second differential amplifier, serves to short-circuit the resistor R7 AC-wise. The first stage of the third differential amplifier is connected via the resistor R6 and the second stage of the third differential amplifier is connected via the resistor R8 to the second reference voltage Ur2. In addition, a blocking capacitor C2 is provided between the input of the second stage of the third differential amplifier and the reference potential. Thus without signal, the inputs of the two stages of the third differential amplifier are also at the same potential. In view of the cascade connection of the three differential amplifiers, the potential of the second reference voltage source Ur2 is more negative than the potential of the first reference voltage source Ur1.

A second integrated circuit IC2, wired as a current mirror (as known in the art) and connected to the operating voltage source −Ub, serves as a current source for the diferential amplifier arrangement contained in the integrated circuit Ic1. The output terminal of the second stage of the first differential amplifier and of the second stage of the second differential amplifier are connected to each other and, via a resistor R3, 4 to the reference potential. In addition the collector terminals are connected to the base terminal of a seventh transistor T7 which collector terminal is connected to the reference potential and which emitter terminal is connected to an output terminal DA and, via a resistor R9, to the supply voltage −Ub. The transistor T7 is wired as an emitter follower. It serves to interface through level shifting to a subsequent D-flipflop—not shown here—for timewise regeneration of the binary signals or of the binary RZ signal. The output A1 of the first stage of the first differential amplifier is connected, via a first resistor R1, to the reference potential and also, via an RC circuit RC, to an eighth, grounded-base driven transistor T8. This transistor's collector terminal is connected, via a coupling capacitor C5, to a terminal TS for a clock signal and in addition, via a parallel resonant circuit damped by a parallel resistor RS, to the reference potential. The parallel resonant circuit comprised of the capacitance CS and of the inductance LS is tuned to the clock frequency of the CMI coded or of the binary signals. The amplifier stage with the transistor T8 is contained in the arrangement TA for the clock derivation according to FIG. 2.

There has thus been shown and described a novel apparatus for a CMI decoder which fulfills all the objects and advantages sought therefor. Many changes, modification, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. CMI decoder for the translation of CMI coded signals into binary signals with differential amplifiers connected to the input side of said decoder, comprising: a first; a second; and a third differential amplifier (T1, T2; T3, T4; T5, T6) wherein an input of a first stage (T1) of said first differential amplifier is connected to an input of a second stage (T4) of said second differential amplifier and to a first reference voltage source (Ur1); an input of a second stage (T2) of said first differential amplifier and of a first stage (T3) of said second differential amplifier being connected to each other and to an input terminal (E); said first differential amplifier forming with a first stage (T5) of said third differential amplifier a first cascade circuit and said second differential amplifier forming with a second stage (T6) of said third differential amplifier a second cascade circuit; an input of said second stage of said third differential amplifier being connected to a second reference voltage source (Ur2) which is at a more negative potential relative to said first reference voltage source; an input of said first stage of said third differential amplifier being connected, via a time delay section τ with a delay corresponding to half a bit length, to said input (E) of said CMI decoder; and wherein outputs (A1 ... A4) of said stages of said first and second differential amplifiers represent the outputs for binary signals which, upon being combined form a RZ signal.

2. CMI decoder according to claim 1, wherein said first stage of said first differential amplifier contains a first transistor (T1) whose collector terminal is connected to a first output terminal (A1) and, via a first resistor (R1), to a reference potential; said second stage of first differential amplifier contains a second transistor (T2) whose collector terminal is connected to a terminal for a third output (A3) and, via a third resistor (R3), to said reference potential; said first stage of said second differential amplifier contains a third transistor (T3) whose collector terminal is connected to a second output terminal (A2) and, via a second resistor (R2), to said reference potential; said second stage of said second differential amplifier contains a fourth transistor (T4) whose collector terminal is connected to a fourth output terminal (A4) and, via a fourth resistor (R4), to said reference potential; a first stage of said third differential amplifier contains a fifth transistor (T5) whose collector terminal is connected to the joined emitter terminals of said first and second transistors (T1, T2); a second stage of said third differential amplifier contains a sixth transistor (T6) whose collector terminal is connected to the joined emitter terminals of said third and fourth transistors (T3, T4); the base terminals of said first and fourth transistors (T1, T4) are connected to each other and to said first reference voltage source (Ur1); the base terminals of said second and third transistors (T2, T3) are connected to said input (E); and wherein the base terminal of said sixth transistor (T6) is connected to said second reference voltage source (Ur2).

3. CMI decoder according to claim 1, wherein when said time delay section (τ) is connected to said input (E) for generating binary signals, a third output (A3) and a fourth output (A4) are interconnected, for generating a joint output; and wherein a first output (1) is provided for connecting thereto a clock derivation circuit (TA).

4. CMI decoder according to claim 1, wherein when said time delay section (τ) is connected to said input (E') for handling an inverse CMI coded signal for generating binary signals, a first and second outputs (A1, A2) are interconnected, for generating a joint output of a binary RZ signal and wherein a fourth output (A4) is provided for connecting thereto a clock derivation circuit (TA).

5. CMI decoder according to claim 3, wherein said clock derivation circuit (TA) comprises a resonant circuit tuned to the clock frequency of said binary signals.

6. CMI decoder according to claim 3, further comprising a first and second D-flipflop and wherein the D-input of said first and second D-flipflop (Df1, Df2), are each separately connected to the binary signal outputs, the clock inputs of said flipflops being connected to each other and to the output of the clock derivation arrangement (TA) and that the inverting outputs ($\overline{Q}$) of the two D-flipflops are connected to each other and to an output (BA) for timewise regenerated, binary signals.

7. CMI decoder according to claim 6, wherein the noninverting outputs (Q) of said two D-flipflops (Df1, Df2) are connected to two signal inputs of a code violation monitor (VM) whose clock input is connected to the output of said clock derivation circuit (TA) and whose output (MA) is connected to a monitoring device.

8. CMI decoder according to claim 7, wherein said CMI decoder is connected to the output (BA) for the timewise regenerated binary signals to produce amplitude- and time-generated CMI signals.

* * * * *